W. AMENDA.
COUNTER FOR FOODS AND BEVERAGES.
APPLICATION FILED SEPT. 27, 1909.
974,622.
Patented Nov. 1, 1910.
3 SHEETS—SHEET 1.
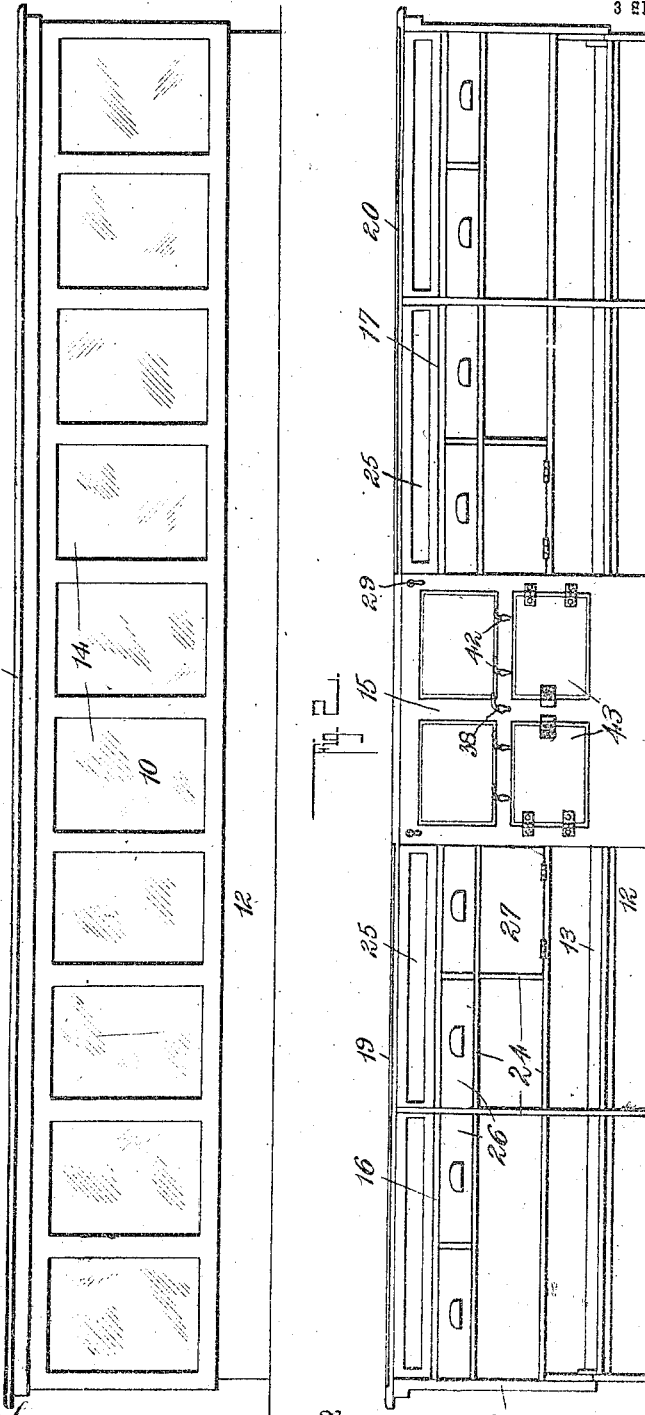
Witnesses
Philip H. Burch
A. R. Walton
Inventor
W. Amenda

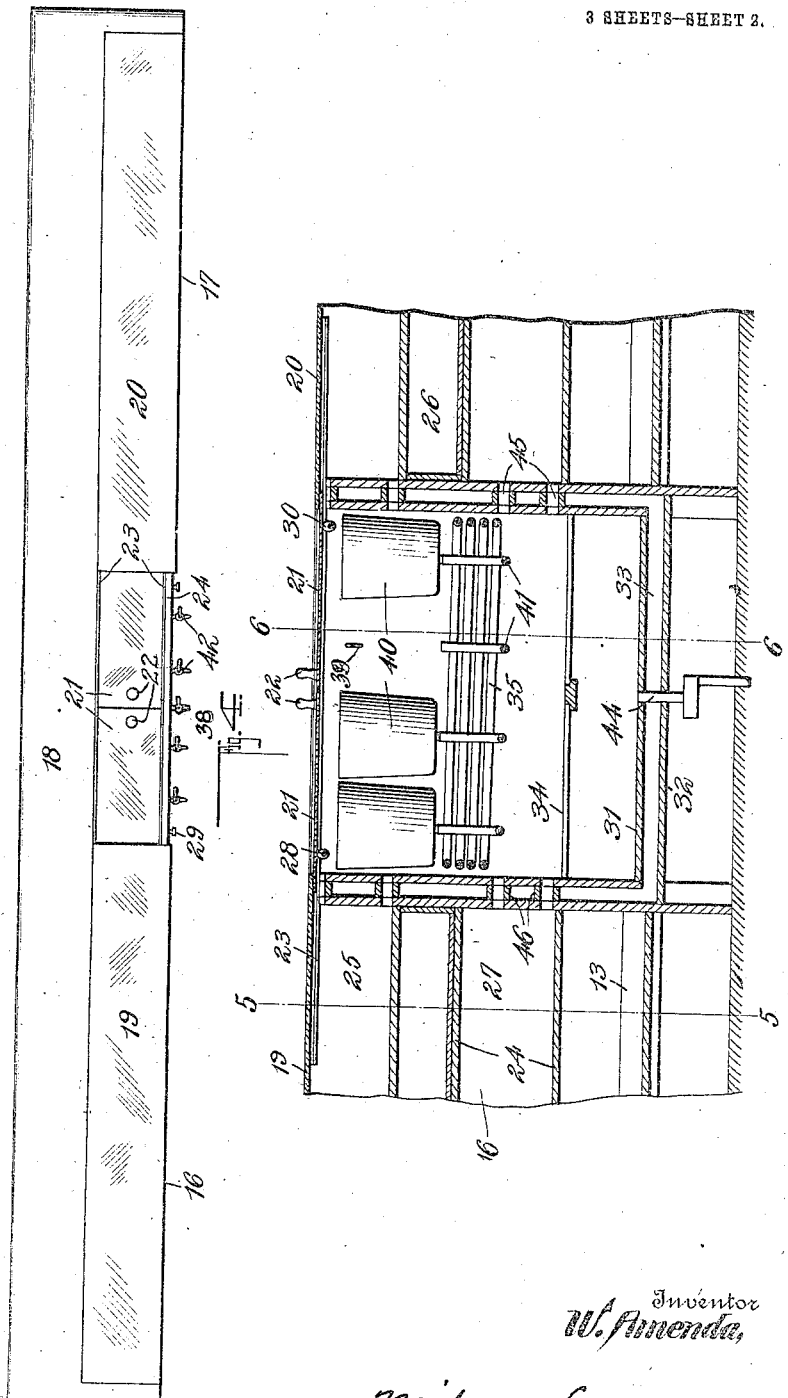

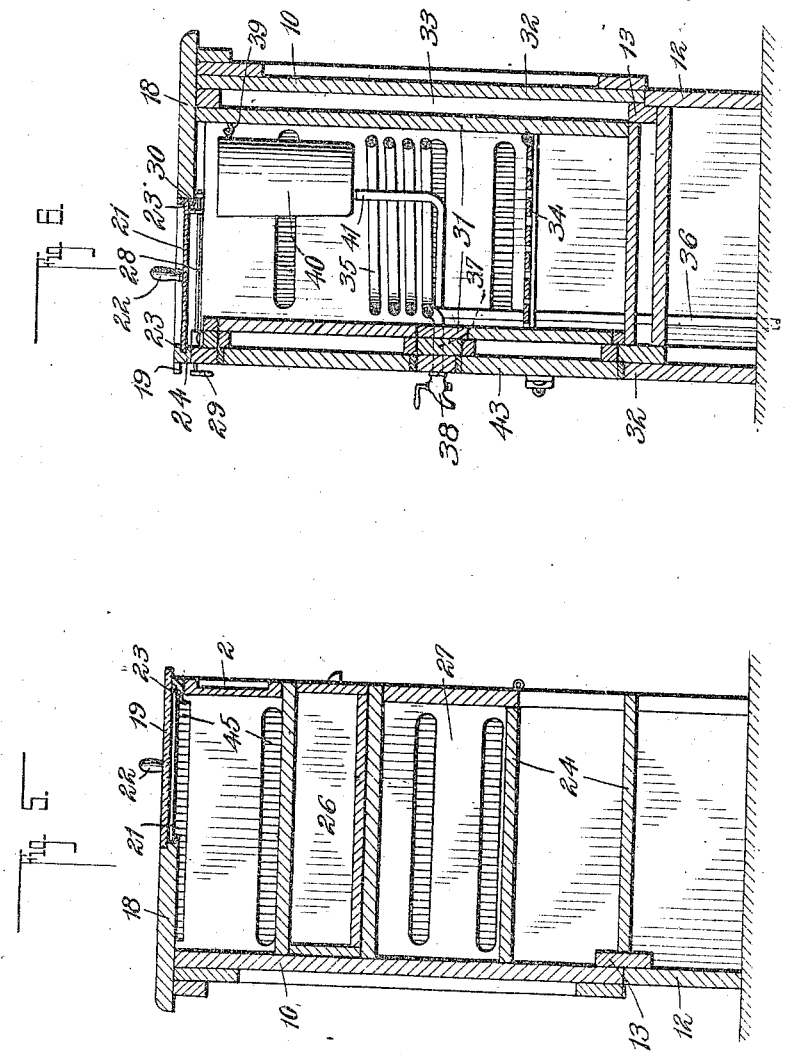

UNITED STATES PATENT OFFICE.

WILLIAM AMENDA, OF OKLAHOMA, OKLAHOMA.

COUNTER FOR FOODS AND BEVERAGES.

974,622. Specification of Letters Patent. Patented Nov. 1, 1910.

Application filed September 27, 1909. Serial No. 519,910.

*To all whom it may concern:*

Be it known that I, WILLIAM AMENDA, a citizen of the United States, residing at Oklahoma city, in the county of Oklahoma and State of Oklahoma, have invented certain new and useful Improvements in Counters for Foods and Beverages, of which the following is a specification.

My invention relates to counters or counter cabinets for foods and beverages in grocery and other stores, and lunchrooms and the like, and my object is to provide a convenient and economical cabinet wherein the contents will be visible from the outside, and which will in all respects accord with the high standard of sanitation of the present day.

Other objects, and the advantages, of my invention, will be apparent from the following description, in which reference is made to the accompanying drawings, forming a part of this specification, and in which, Figure 1 is a front elevation of my improved counter cabinet. Fig. 2 is a rear elevation thereof. Fig. 3 is a top plan view thereof. Fig. 4 is a vertical longitudinal section through the central portion thereof. Fig. 5 is a transverse sectional view taken on the line 5—5 of Fig. 4, and, Fig. 6 is a similar view taken on line 6—6 of Fig. 4.

In the practical embodiment of my invention I provide a counter cabinet which comprises an unbroken front wall 10 and end walls 11, the front wall having a longitudinal base slab 12, of marble or the like held by longitudinal cleat board 13 upon the interior face of wall 10. The wall 10 has also a longitudinal series of transparent panels 14. Strictly speaking my improved counter embodies three sections, namely a central refrigerator section 15, and side cabinet sections 16 and 17, one upon each side of section 15. The top or counter board 18 extends over the front and end walls 10 and 11, and is provided with transparent sections 19 and 20 set therein over the cabinet sections 16 and 17 respectively. The counter board 18 is also cut away at its rear edge above the refrigerator section 15, to provide for the reception of oppositely slidable glass doors 21 having handles or knobs 22 upon their adjacent edges, and adapted to slide laterally beneath the transparent counter sections 19 and 20 in guides 23 carried by the top or counter board 18 and the skeleton frames 24 forming the rear walls of the cabinet sections 16 and 17. The skeleton rear walls support the sliding doors 25 to the upper compartments, the drawers 26, and the hinged doors 27, each opening into compartments within the cabinet sections where food may be kept.

Mounted transversely through the upper portion of the refrigerator section 15 are rotatable rods 28 carrying exterior handles 29, and interior cams 30 which are adapted to bind against the sliding doors 21 and hold the same in the closed position.

The refrigerator section 15 has inner and outer walls 31 and 32, between which is an insulating dead air space 33. The interior thereof is provided with a slat shelf 34, and with a water coil 35 which receives water from a low service pipe 36, and terminates in a discharge pipe 37 projecting rearwardly through the rear wall and provided with a dispensing faucet 38. Upon the inner front wall on hooks 39 is hung a series of tanks 40, adapted to receive beverages, each tank having a discharge pipe 41 leading rearwardly through the rear wall and provided with a dispensing faucet 42. The coil 35 is arranged just below the tanks 40, as shown, and is adapted to support cracked or crushed ice by which the water therein is quickly cooled, as are said tanks. The refrigerator section also has rear doors 43 leading into its lower portion, and a waste pipe 44 leading downwardly from its base. The side walls 31 and 32 are provided with upper, lower and intermediate slotted perforations 45, which perforations extend also through plugs 46 between said walls, and permit the cooling air to circulate through the cabinet sections.

I claim:

A counter cabinet of the character described, embodying an intermediate cooling section, a series of beverage holding tanks removably held within said cooling section against one wall thereof, separate discharge pipes leading downwardly from said tanks and horizontally across said cooling section and through its opposite wall, separate discharge faucets for said discharge pipes, and a water pipe adapted for connection to a service pipe at one end and having a discharge faucet at its opposite end adjacent said beverage faucets, and embodying a series of horizontal coils superposed one upon the other and surrounding and overlying the horizontal portions of said tank discharge pipes.

In testimony whereof I affix my signature, in presence of two witnesses.

WILLIAM AMENDA.

Witnesses:
W. F. BLAND,
ERNEST CHAMBERS.